US010200400B2

(12) United States Patent
Robish

(10) Patent No.: US 10,200,400 B2
(45) Date of Patent: Feb. 5, 2019

(54) METHOD FOR AVOIDING ATTRIBUTION WHILE TRACKING CRIMINALS

(71) Applicant: NetSec Concepts, LLC, Sturgis, SD (US)

(72) Inventor: Ethan Robish, West Fargo, ND (US)

(73) Assignee: NETSEC CONCEPTS LLC, Sturgis, SD (US)

( * ) Notice: Subject to any disclaimer, the term of this patent is extended or adjusted under 35 U.S.C. 154(b) by 342 days.

(21) Appl. No.: 15/234,876

(22) Filed: Aug. 11, 2016

(65) Prior Publication Data
US 2018/0048672 A1    Feb. 15, 2018

(51) Int. Cl.
*H04L 29/06* (2006.01)
*H04L 29/08* (2006.01)

(52) U.S. Cl.
CPC ...... *H04L 63/1441* (2013.01); *H04L 63/1416* (2013.01); *H04L 63/308* (2013.01); *H04L 63/0407* (2013.01); *H04L 67/02* (2013.01)

(58) Field of Classification Search
None
See application file for complete search history.

(56) References Cited

U.S. PATENT DOCUMENTS

| 6,408,391 B1 * | 6/2002 | Huff ...................... G06F 21/305 726/22 |
| 6,757,822 B1 * | 6/2004 | Feiertag .............. H04L 63/1408 709/224 |
| 8,583,915 B1 * | 11/2013 | Huang ................ H04L 63/0869 713/155 |
| 9,716,727 B1 * | 7/2017 | Seger .................. H04L 63/1491 |
| 2006/0018466 A1 * | 1/2006 | Adelstein ............ H04L 63/1425 380/46 |

(Continued)

OTHER PUBLICATIONS

Dennis Brown, Resilient Botnet Command and Control with Tor, 2010, retreived from https://www.defcon.org/images/defcon-18/dc-18-presentations/D.Brown/DEFCON-18-Brown-TorCnC.pdf.*

(Continued)

*Primary Examiner* — Lynn D Feild
*Assistant Examiner* — Richard A McCoy
(74) *Attorney, Agent, or Firm* — Goodhue, Coleman & Owens, P.C.

(57) ABSTRACT

A method for performing attribution on an adversary engaged in attacking a computer system while preventing the adversary from performing attribution includes steps of providing a callback server operatively connected to a communications network, configuring an anonymity system associated with the callback server, delivering executable code to an adversary computer operatively connected to the communications network and used by the adversary engaged in attacking the computer system wherein the executable code is executed by the adversary computer to send information associated with the adversary computer to the callback server through the anonymity system, routing the information associated with the adversary computer through the anonymity system to prevent the adversary from obtaining attribution associated with the callback server, receiving the information associated with the adversary computer at the callback server, and performing attribution on the adversary using the information associated with the adversary computer.

15 Claims, 4 Drawing Sheets

(56) References Cited

U.S. PATENT DOCUMENTS

| | | | | |
|---|---|---|---|---|
| 2006/0130144 | A1* | 6/2006 | Wernicke | G06F 21/52 726/24 |
| 2006/0259970 | A1* | 11/2006 | Sheymov | G06F 21/55 726/23 |
| 2010/0031358 | A1* | 2/2010 | Elovici | H04L 41/147 726/24 |
| 2010/0218253 | A1* | 8/2010 | Sutton | G06F 21/554 726/23 |
| 2011/0078797 | A1* | 3/2011 | Beachem | G06F 21/53 726/25 |
| 2013/0072306 | A1* | 3/2013 | Parnprome | G06F 21/52 463/42 |
| 2014/0237599 | A1* | 8/2014 | Gertner | H04L 63/145 726/24 |
| 2015/0033347 | A1* | 1/2015 | Sulaiman | H04L 63/1433 726/25 |
| 2015/0295943 | A1* | 10/2015 | Malachi | H04L 63/145 726/24 |

OTHER PUBLICATIONS

Jake Laperruque, How CISA's Countermeasures Authorization Threatens Security, Jul. 28, 2015; retrieved from https://cdt.org/blog/how-cisas-countermeasures-authorization-threatens-security/.*

Christian Dietrich, Pierre-Marc Bureau, Hiding in Plain Sight, 2015; retreived from https://www.blackhat.com/docs/eu-15/materials/eu-15-Bureau-Hiding-In-Plain-Sight-Advances-In-Malware-Covert-Communication-Channels-wp.pdf.* learncryptography.com/steganography; Jul. 2, 2013; retrieved from internet archive at https://web.archive.org/web/20130702001429/https://learncryptography.com/steganography.*

EFF/ eff.org, "Yes, CISPA Could Allow Companies to Filter or Block Internet Traffic", Apr. 17, 2012, retreived from https://www.eff.org/deeplinks/2012/04/yes-cispa-could-allow-companies-filter-or-block-internet-traffic.*

* cited by examiner

METHOD FOR AVOIDING ATTRIBUTION WHILE TRACKING CRIMINALS

FIELD OF THE INVENTION

The present invention relates to information security. More particularly, but not exclusively, the present invention relates to performing attribution on an adversary while preventing the adversary from performing attribution.

BACKGROUND

The internet can offer anonymity to a knowledgeable adversary. One area of interest is developing measures to allow organizations such as companies and law enforcement to discover the locations and identities of adversaries. This is known as attribution. However, a knowledgeable adversary may observe the attempts at attribution and also learn which organization is targeting him or her. If the adversary has this knowledge of who is attempting to discover his or her identity and location, he or she can use this to his or her advantage. Some possible defenses an adversary could use are developing better strategies at avoiding attribution or even retaliating against the organization in the form of cyberattacks or physical attacks. With the concern of retaliation to an organization or physical threats and attacks against the individuals working for the organization, it becomes very important for the organization to avoid attribution itself while also performing attribution on the adversary.

Therefore, what is needed are methods and systems for avoiding attribution while tracking adversaries such as criminals.

SUMMARY

Therefore, it is a primary object, feature, or advantage of the present invention to improve over the state of the art.

It is a further object, feature, or advantage of the present invention to provide methods and systems which allow for obtaining attribution information from those performing an attack on a computer system without exposing attribution information from those protecting the computer system under attack.

According to one aspect, a method for performing attribution on an adversary engaged in attacking a computer system while preventing the adversary from performing attribution includes steps of providing a callback server operatively connected to a communications network, configuring an anonymity system associated with the callback server, delivering executable code to an adversary computer operatively connected to the communications network and used by the adversary engaged in attacking the computer system wherein the executable code is executed by the adversary computer to send information associated with the adversary computer to the callback server through the anonymity system, routing the information associated with the adversary computer through the anonymity system to prevent the adversary from obtaining attribution associated with the callback server, receiving the information associated with the adversary computer at the callback server, and performing attribution on the adversary using the information associated with the adversary computer. The step of performing attribution on the adversary may include determining a location of the adversary computer, determining an identity or profile of the adversary, or determining one or more administrators of the adversary computer. The executable code may be a part of a software application or may be embedded in a web page or otherwise. The anonymity system may include an anonymizing proxy, a Tor hidden service, another example of a darknet service, or a public service. The anonymity system may provide for encrypting the information associated with the adversary computer, encoding the information associated with the adversary computer, or generating stenography containing the information associated with the adversary computer.

One or more of these and/or other aspects, objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any aspects, objects, features, or advantages stated herein.

DETAILED DESCRIPTION

The present invention relates to information security. In particular, the present invention relates to hiding one's identity and location on the Internet from an adversary. The adversary executes software or visits a webpage and the code causes the adversary's computer to connect to a callback server. Under normal circumstances, this connection is made directly and the adversary would be able to trace the connection back to the callback server. However, here, the callback connection is routed through an anonymizing technology in such a way that the adversary is unable to trace the connection. These anonymizing technologies may include, without limitation, anonymizing proxies and darknets such as Tor, I2P, and Freenet. Darknets are distributed networks running on top of existing Internet technologies. They use the members of the network to distribute, anonymize, and often encrypt traffic.

Attribution software requires a way to transmit information about the adversary back to an organization, to a device known as a callback server. Here, anonymization technologies are used to anonymize the location, identity, and administrators of the callback server in order to protect against physical or digital retaliation from the adversary.

An attacker might observe communication to the callback server and attempt attribution on the callback server. An attacker could attempt to determine the domain name or IP address of the callback server and then perform a WHOIS query on the domain name or IP address of the callback server. The attacker's attempts would be prevented when using a Tor hidden service for a callback server and a Tor2Web service as an intermediary because the only information disclosed would be the address of the callback server on the Tor network. Due to the nature of hidden services, the address of a Tor hidden service does not disclose any attributable data about the server.

Figure 1:
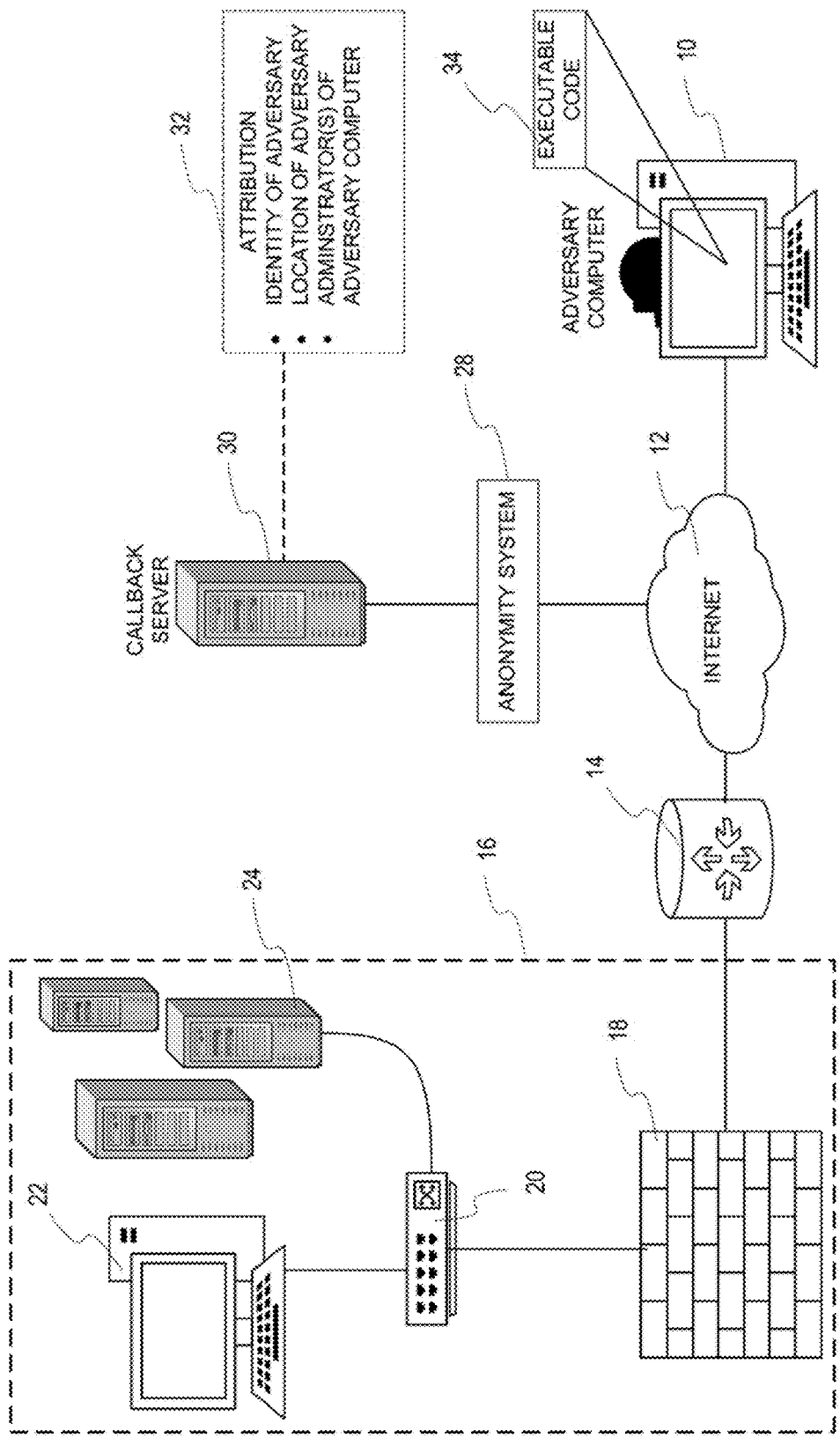
FIG. 1 illustrates one example where an anonymity system is used to prevent an adversary from obtaining attribution information while allowing for the collection of attribution information associated with the adversary.

FIG. 1 illustrates one example of determining attribution information for an adversary computer. As shown in FIG. 1, there is an adversary computer 10 associated with a remote attacker or adversary. Various machines including machine 22 and servers 24 are operatively connected to the internet 12 or other network, through a router 14, and through a firewall 18 associated with a network 16 to a network switch 20. Note that the network shown in FIG. 1 is merely one example of a simplified network topology for explanatory purposes. Any number of different network topologies may be used.

After or during an attempt by the attacker to attack one or more machines on the network 16, a software application containing executable code 34 or a web page with embedded executable code 34 is accessed by the adversary computer 10. Various methods may be used in order to result in such executable code being accessed. This may include storing the software application at a location of high interest or with an enticing name or through other methods including social engineering methods.

The executable code 34 may be implemented in any number of ways. For example, the executable code may be implemented via Python, Java, JavaScript, C, C++, Perl, or any number of other computer languages.

Once executed, this results in the collection of attribution data 32 to be communicated to a callback server 30. Examples of attribution data may include the identity of an adversary, a location of the adversary, administrator(s) of the adversary computer, or other information about the adversary computer, its users, or its activities. For example, physical location information may be in the form of geospatial information such as GPS coordinates, wireless network signal information, or cellular status. Examples of digital location information may include IP address or traceroute information. System and user profile information may include operating system, browser, plugins, screen size and resolution, battery status, system time and time zone, language settings, hostname, username, websites visited, or other information.

Anonymization technologies associated with an anonymity system 28 may be used in order to prevent the adversary from attributing the callback server 30 to a particular person, company, location, etc. or to otherwise protect the identity of the callback server and its operators. Various types of anonymity systems may be used. For example, an anonymizing proxy may be used. However, this requires finding services to host the proxy. Many such services that provide such hosting require personal information and do checking to prevent fraud. Moreover, these types of services are becoming increasingly difficult to find. Other types of anonymity systems may include darknet technologies and systems such as the Tor hidden web service and similar services which do not require any verification of identity to use.

Figure 2:
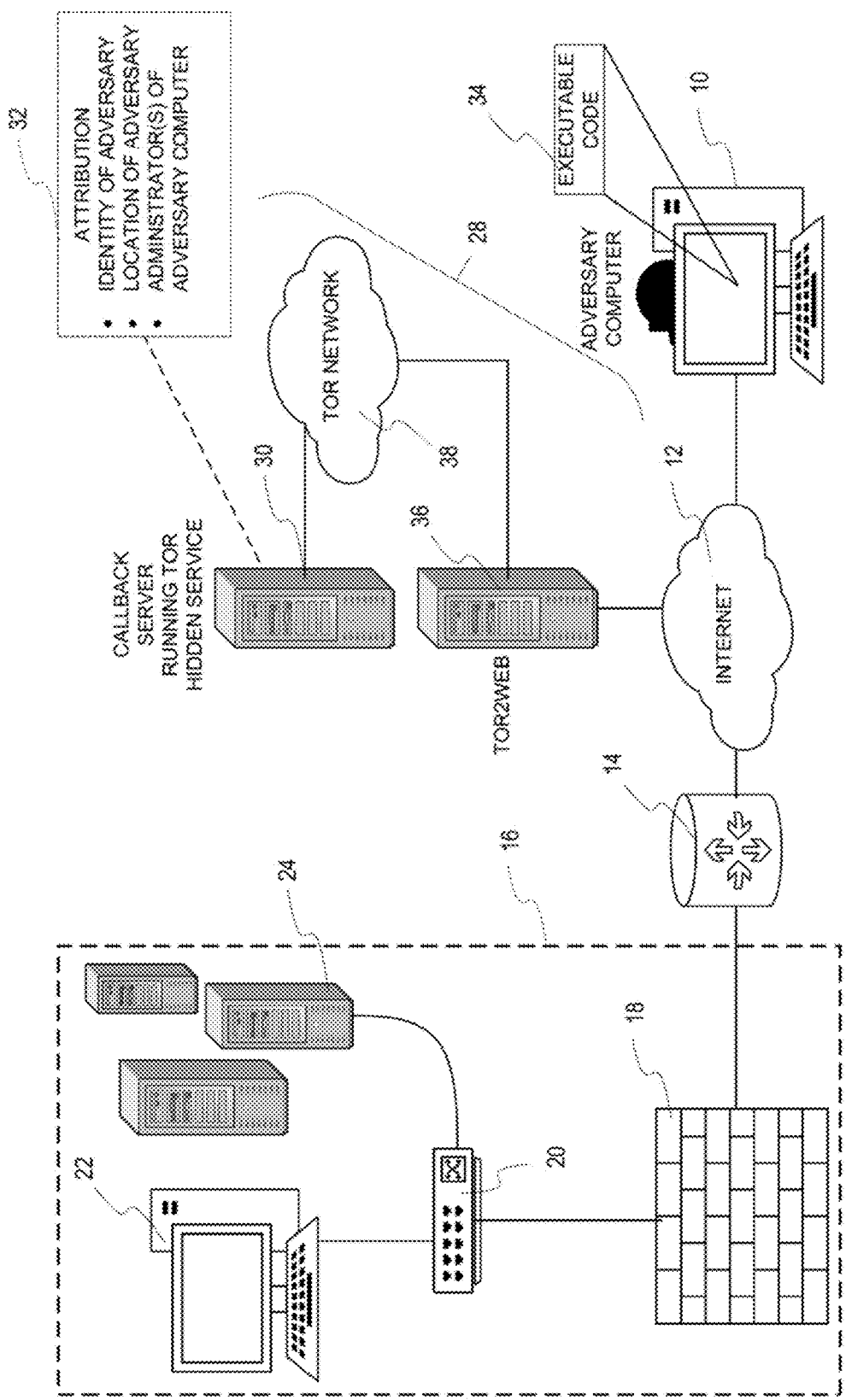
FIG. 2 illustrates a system where a Tor hidden service is used as a part of an anonymity system.

FIG. 2 illustrates a more detailed example. In FIG. 2, the attacker associated with the adversary computer 10 may attempt to determine who is obtaining the attribution data 32. In this example, the anonymity system 28 provides for hiding identity or other attribution data of the callback server 30 through using darknet technologies such as Tor. Here, the attacker may see information being sent to a Tor2Web service such as the one hosted at tor2web.org. The Tor2Web server 36 then forwards the information to the callback server 30 through the Tor network 38. All the attacker sees is the information going to the Tor2Web service and not the attribution information for the callback server 30. Even if the attacker gains access to the Tor2Web service, the callback server 30 may be running as a hidden service on the Tor network 38 thereby making it very difficult for the adversary to further track the attribution information.

Figure 3:
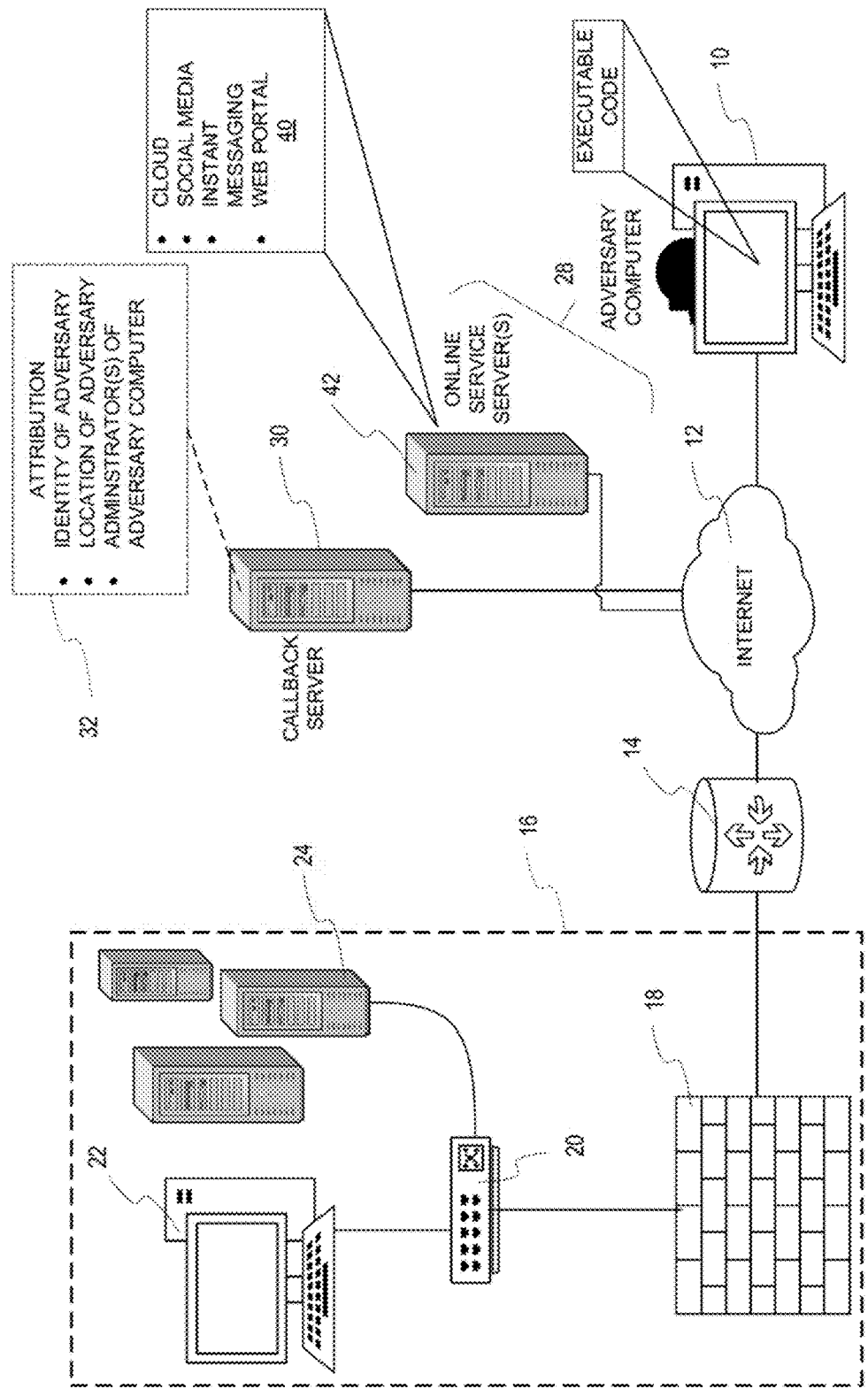
FIG. 3 illustrates a system where one or more online service providers are used as a part of an anonymity system.

FIG. 3 illustrates another example. In FIG. 3, a different type of anonymity system 28 may be used. Here, the attribution information is anonymized through one or more servers 42 associated with an online service 40. The online service 40 may be of any number of types of services 42. For example, the online service 40 may be associated with cloud storage services. The online service 40 may be associated with instant messaging services. The online service 40 may be associated with any number of different types of social media services. The online service 40 may be associated with any number of different web portals. Accounts may be created anonymously (potentially with fake information if necessary), such that the adversary would have no way of knowing the identity of the account owner. In addition, using encryption, encoding, or stenography, attribution information may be hidden. Moreover, using stenography, even the presence of the attribution may be hidden. For example, information regarding attribution 32 may be embedded in different files including image files such as JPGs or PNGs which are made available through the online service 40 so as to both reduce the likelihood of an adversary identifying the information using network scanning tools as well as to encode the information. The callback server 30 may access the online service 40 to retrieve the attribution data 32.

Figure 4:
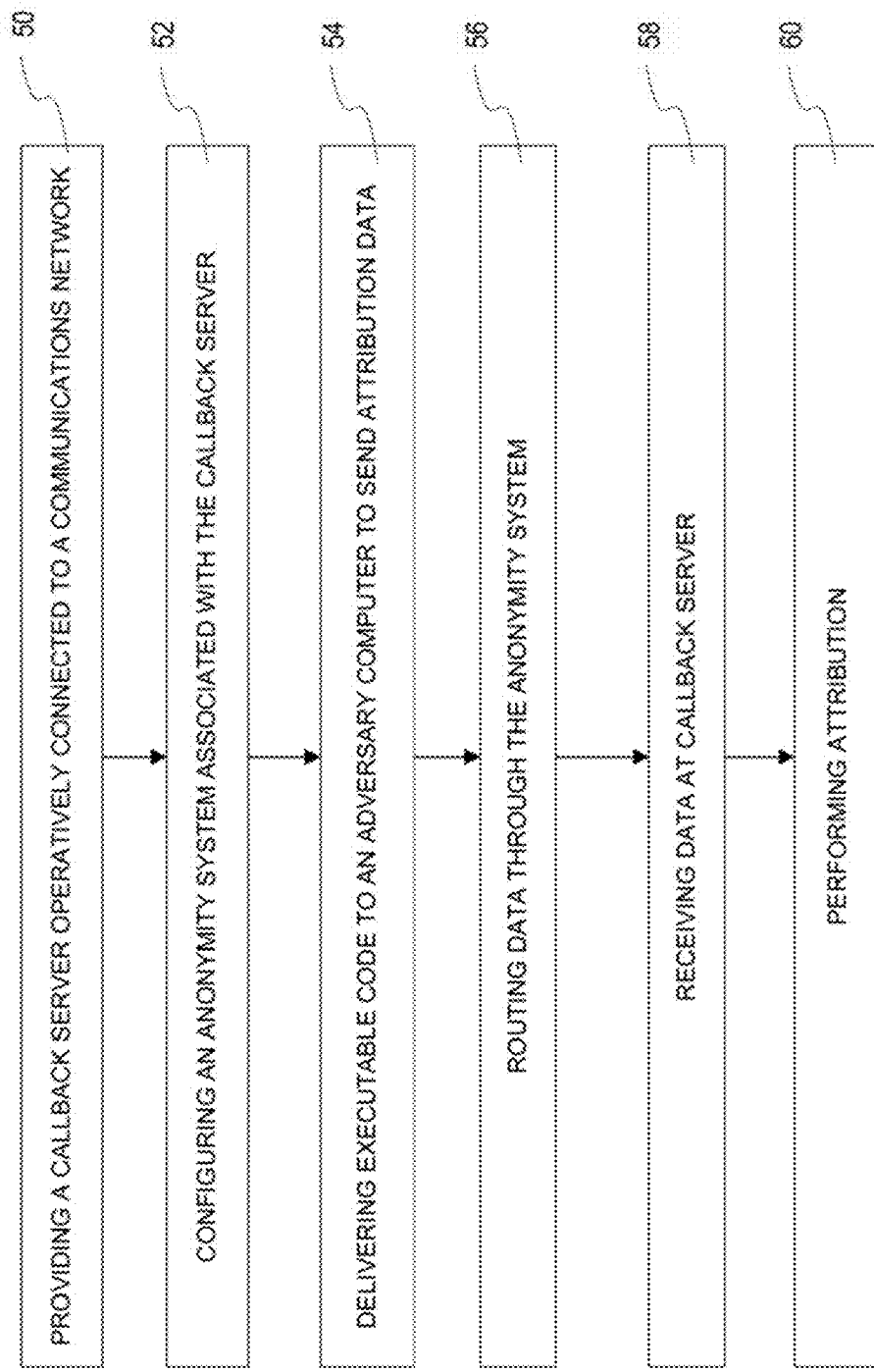
FIG. 4 illustrates one example of a method for performing attribution on an adversary engaged in attacking a computer system while preventing the adversary from performing attribution.

FIG. 4 illustrates one example of a method performing attribution on an adversary engaged in attacking a computer system while preventing the adversary from performing attribution. In step 50 a callback server which is operatively connected to a communications network is made available or otherwise provided such as by providing access to the server. In step 52, an anonymity system associated with the callback server is configured. The specific manner in which the anonymity system is configured is dependent upon the type of anonymity system used. Thus configuring the anonymity system may involve configuring a Tor web service or other darknet technology, configuring an anonymizing proxy server, configuring one or more online services, or may otherwise involve programing or applying settings to an anonymity system. In step 54, executable code is delivered to an adversary computer. The purpose of the executable code is to collect and send attribution data back to the callback server through one or more anonymity systems. In step 56 attribution data is routed through one or more anonymity systems. In step 58, the attribution data is received at a callback server. In step 60, attribution is performed.

Therefore, various methods, systems, and apparatus have been showed and described. Although various embodiments have been set forth herein, it is to be understood that numerous options, variations, and alternatives are contemplated. This may include variations in the type of anonymity system, the manner in which the methods are implemented, the type of attribution data collected, and other options, variations, and alternatives.

What is claimed is:

1. A method for performing attribution on an adversary engaged in attacking a computer system while preventing the adversary from performing attribution, the method comprising steps of:
    providing a callback server operatively connected to a communications network;
    configuring an anonymity system associated with the callback server;

delivering executable code to an adversary computer operatively connected to the communications network and used by the adversary engaged in attacking the computer system wherein the executable code is executed by the adversary computer to send information, contained by stenography, associated with the adversary computer to the callback server running as a hidden service on a Tor network using a Tor2Web service;

routing the information associated with the adversary computer through the anonymity system to prevent the adversary from obtaining attribution associated with the callback server;

receiving the information associated with the adversary computer at the callback server; and performing attribution on the adversary using the information associated with the adversary computer.

2. The method of claim 1 wherein the step of performing attribution on the adversary comprises determining a location of the adversary computer.

3. The method of claim 1 wherein the step of performing attribution on the adversary comprises determining an identity of the adversary.

4. The method of claim 1 wherein the step of performing attribution on the adversary comprises determining one or more administrators of the adversary computer.

5. The method of claim 1 wherein a software application comprise the executable code.

6. The method of claim 1 wherein the executable code is embedded in a web page.

7. The method of claim 1 wherein the anonymity system comprises an anonymizing proxy.

8. The method of claim 1 wherein the anonymity system comprises a darknet service.

9. The method of claim 1 wherein the anonymity system comprises a public service with an anonymous account.

10. The method of claim 1 wherein the configuring the anonymity system comprises configuring the anonymity system to encrypt the information associated with the adversary computer.

11. The method of claim 1 wherein the configuring the anonymity system comprises configuring the anonymity system to encode the information associated with the adversary computer.

12. The method of claim 1 wherein the configuring the anonymity system comprises configuring the anonymity system to generate stenography containing the information associated with the adversary computer.

13. The method of claim 1 wherein the configuring the anonymity system comprises configuring the anonymity system to encrypt the information associated with the adversary computer to provide encrypted information and submitting the encrypted information through a public service.

14. The method of claim 1 wherein the configuring the anonymity system comprises configuring the anonymity system to encode the information associated with the adversary computer to provide encoded information and submitting the encoded information through a public service.

15. The method of claim 1 wherein the configuring the anonymity system comprises configuring the anonymity system to generate stenography containing the information associated with the adversary computer to provide hidden encoded information and submitting the hidden encoded information through a public service.

* * * * *